United States Patent
Yu et al.

(10) Patent No.: US 11,952,289 B2
(45) Date of Patent: Apr. 9, 2024

(54) METHOD FOR PREPARING NICKEL SULFATE FROM NICKEL-IRON-COPPER ALLOY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: Guangdong Brunp Recycling Technology Co., Ltd., Guangdong (CN); Hunan Brunp Recycling Technology Co., Ltd., Hunan (CN); Hunan Brunp Ev Recycling Co., Ltd., Hunan (CN)

( * ) Notice: Subject to any disclaimer, the term of this patent is extended or adjusted under 35 U.S.C. 154(b) by 0 days.

(21) Appl. No.: 18/260,238

(22) PCT Filed: Jun. 6, 2022

(86) PCT No.: PCT/CN2022/097188
§ 371 (c)(1),
(2) Date: Jun. 30, 2023

(87) PCT Pub. No.: WO2023/284441
PCT Pub. Date: Jan. 19, 2023

(65) Prior Publication Data
US 2023/0399240 A1  Dec. 14, 2023

(30) Foreign Application Priority Data
Jul. 15, 2021 (CN) .......................... 202110799807.6

(51) Int. Cl.
*C01G 53/10* (2006.01)
*C01G 53/00* (2006.01)

(52) U.S. Cl.
CPC .......... *C01G 53/10* (2013.01); *C01G 53/003* (2013.01); *C01P 2006/80* (2013.01)

(58) Field of Classification Search
CPC .... C01G 53/10; C01G 53/003; C01P 2006/80
See application file for complete search history.

(56) References Cited

U.S. PATENT DOCUMENTS

| 2,726,934 A | * | 12/1955 | Arthur | C22B 3/14 423/150.5 |
|---|---|---|---|---|
| 3,767,762 A | | 10/1973 | Kunda | |
| 2010/0199807 A1 | * | 8/2010 | Stiksma | C01G 31/02 75/743 |

FOREIGN PATENT DOCUMENTS

| CN | 101177735 A | 5/2008 |
|---|---|---|
| CN | 102212698 A | 10/2011 |

(Continued)

OTHER PUBLICATIONS

International Search Report in PCT/CN2022/097188, mailed Sep. 1, 2022, 6 pages.

*Primary Examiner* — Anthony J Zimmer
*Assistant Examiner* — Syed T Iqbal
(74) *Attorney, Agent, or Firm* — ArentFox Schiff LLP

(57) ABSTRACT

Disclosed in the present invention is a method for preparing nickel sulfate from a nickel-iron-copper alloy. The method comprises: in a high-pressure oxygen environment, mixing a nickel-iron-copper alloy crushed material, aqueous ammonia, ammonium sulphate, and a corrosion assisting agent, leaching, then performing solid-liquid separation on the leached slurry, adding a precipitant into a filtrate, and performing ammonia distillation to obtain a nickel-containing leachate; then adding an extractant into the nickel- (Continued)

containing leachate to extract nickel so as to obtain a nickel-containing extraction organic phase; and then adding sulfuric acid into the nickel-containing extraction organic phase to perform back extraction of nickel so as to obtain a nickel sulfate solution. According to the present invention, the nickel-iron-copper alloy is separated by using different properties of nickel and iron, nickel is dissolved in a hexamine complex of nickel, iron cannot be dissolved and then continues to be remained in a solid, after the filtrate is collected, the precipitant is added and ammonia distillation is performed to remove copper, the aqueous ammonia is recycled, and the copper ions react with the precipitant to generate a copper sulfide precipitate, and thus, copper in the filtrate is removed, and the purity of nickel sulfate is further improved.

7 Claims, 1 Drawing Sheet

(56) References Cited

FOREIGN PATENT DOCUMENTS

| | | | |
|---|---|---|---|
| CN | 104651620 | A | 5/2015 |
| CN | 104928478 | A | 9/2015 |
| CN | 105567974 | A | 5/2016 |
| CN | 108117105 | A | 6/2018 |
| CN | 111057847 | A | 4/2020 |
| CN | 111065752 | A | 4/2020 |
| CN | 111498918 | A | 8/2020 |
| CN | 112941313 | A | 6/2021 |
| CN | 113265532 | A | 8/2021 |
| CN | 113666437 | A | 11/2021 |
| GB | 761129 | A | 11/1956 |
| GB | 1386921 | A | 3/1975 |
| GB | 1439100 | A | 6/1976 |

* cited by examiner

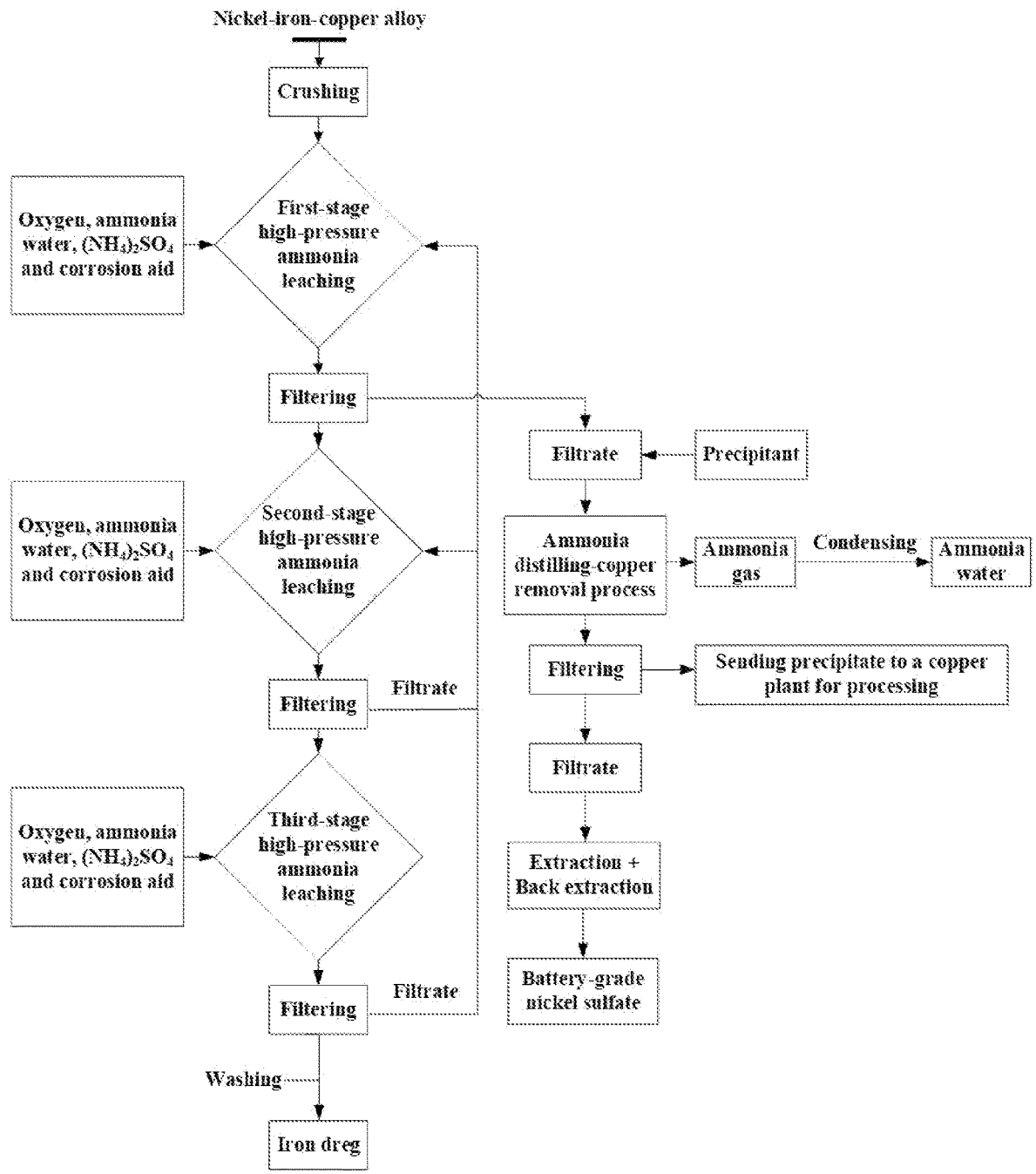

METHOD FOR PREPARING NICKEL SULFATE FROM NICKEL-IRON-COPPER ALLOY

CROSS REFERENCE TO RELATED APPLICATION(S)

This application is a National Phase entry of PCT Application No. PCT/CN2022/097188, entitled "METHOD FOR PREPARING NICKEL SULFATE FROM NICKEL-IRON-COPPER ALLOY" and filed on Jun. 6, 2022, which claims priority of Chinese Application No. 202110799807.6 entitled "METHOD FOR PREPARING NICKEL SULFATE FROM NICKEL-IRON-COPPER ALLOY" and filed on Jul. 15, 2021, both of which are expressly incorporated by reference herein in their entirety.

TECHNICAL FIELD

The present disclosure relates to a metallurgical technology field, and specifically relates to a method for preparing nickel sulfate from a nickel-iron-copper alloy.

BACKGROUND

The molecular formula of nickel sulfate is $NiSO_4 \cdot 6H_2O$, which can be classified as a nickel salt part of primary nickel, but it is not equivalent to nickel salt which covers nickel sulfate. Nickel sulfate has three forms: anhydride, hexahydrate and heptahydrate, and most of the commercial products are in the form of hexahydrate. In an electroplating industry, nickel sulfate is the main nickel salt for electroplating nickel and chemical nickel, and is widely used in manufacturing industries such as machines, instruments, meters, medical devices, and household appliances. Battery-grade nickel sulfate is a source of metal nickel in a ternary material, and a ternary lithium battery is a power source of new energy electric vehicles which are developing rapidly at present. Since the level of nickel contained in ternary lithium batteries directly determines the charging capacity of a battery, the development of high-nickel ternary lithium batteries is a general trend.

The main raw materials of nickel sulfate include high nickel matte, intermediate products of hydrometallurgy of nickel, nickel briquettes/nickel powders, waste nickel, and the like. The preparation route of nickel sulfate can be divided into the following types: 1) nickel sulfide ore is subjected to pyrometallurgy and atmospheric acid leaching to produce high nickel matte, and then nickel sulfate is produced; 2) nickel sulfate is produced by acid leaching intermediate products of hydrometallurgy of nickel laterite, such as smelted nickel cobalt hydroxide, or a purchased nickel hydroxide; 3) pure nickel (such as nickel plate, nickel briquettes/nickel powders) is acid-dissolved and crystallized to obtain crude nickel sulfate crystals, which is dissolved and impurity removed and concentrated to prepare a battery-grade nickel sulfate crystals; 4) a nickel laterite RKEF is used to produce ferronickel, which is then subjected to converter blowing and pressure acid leaching to produce high nickel matte, which in turn to prepare nickel sulfate; and 5) wastes are used as raw materials to prepare nickel sulfate. Among nickel-containing wastes, electroplating wastes, catalysts, battery wastes, and waste alloys can all be used to recover nickel.

With economic development, the demand for copper and nickel is gradually increasing, while copper and nickel resources are declining year by year and will inevitably be exhausted. In order to alleviate the pressure of insufficient resources, the comprehensive utilization of secondary resources will be paid more and more attention.

In non-ferrous smelting, copper and nickel are often mixed together, and a lot of iron is also mixed therein. The composition of nickel-copper-iron alloys is generally 5%-55% of Fe, 10%-45% of Cu, and 3%-45% of Ni. In industry, pyrometallurgical or hydrometallurgical processes are generally used to separate metals such as copper, nickel, iron and the like, and then the metals are further purified. These processes generally have problems such as high production cost, long process flow, large environmental pollution, low yield and the like.

At the same time, nickel-copper-iron alloy wastes, mainly including wastes generated during machining, wastes generated during smelting, and damaged alloy components and parts in industrial sectors, are increasing year by year. In addition, the current chemical composition of alloy wastes circulating in the domestic market is mainly nickel, copper, and iron. Strengthening the utilization of these resources will undoubtedly have a positive effect on alleviating the pressure on nickel and copper resources. However, the current utilization method of the alloy wastes is adding such alloy wastes as an alloy element additive in the alloy manufacturing process after classification, which has a low utilization rate and poor economic performance.

SUMMARY

The present disclosure aims to solve at least one of the above-mentioned technical problems existing in the prior art. Accordingly, the present disclosure provides a method for preparing nickel sulfate from a nickel-iron-copper alloy, which can prepare a battery-grade nickel sulfate, and has the advantages of short process flow, low consumption of auxiliary materials, high nickel yield, and the like.

According to one aspect of the present disclosure, a method for preparing nickel sulfate from a nickel-iron-copper alloy is proposed, comprising the following steps:

S1: mixing a crushed nickel-iron-copper alloy, ammonia water, ammonium sulfate and a corrosion aid in a high-pressure oxygen environment for leaching;

S2: performing a solid-liquid separation on a slurry obtained by leaching in step S1 to obtain a first filtrate and a first residue, adding a precipitant to the first filtrate, then distilling ammonia, and then performing filtration to obtain a nickel-containing leaching solution; and S3: adding an extractant into the nickel-containing leaching solution to extract nickel, allowing the system to stand and then separating to obtain a nickel-containing extracted organic phase, and then adding sulfuric acid into the nickel-containing extracted organic phase to perform a back extraction of nickel to obtain a nickel sulfate solution.

In some embodiments of the present disclosure, in step S2, the first residue is mixed with ammonia water, ammonium sulfate and a corrosion aid for a second-stage leaching, then a second residue and a second filtrate are obtained by a solid-liquid separation, and the second filtrate is subjected back to the leaching in step S1.

In some embodiments of the present disclosure, in step S2, the second residue is mixed with ammonia water, ammonium sulfate and a corrosion aid for a third-stage leaching, then a third residue and a third filtrate are obtained by a solid-liquid separation, and the third filtrate is subjected back to the leaching in step S1 or the second-stage leaching, and the third residue is washed to obtain an iron dreg. Through the multi-stage leaching process, repeated leaching can increase the nickel yield while keeping the iron in the solid all the time.

In some embodiments of the present disclosure, the corrosion aid is at least one of ammonium sulfide, persulfate, or ammonium thiosulfate. The use of ammonium sulfide and ammonium thiosulfate as corrosion aids can reduce the dissolution of copper during the leaching process, and the use of persulfate can quickly oxidize metallic nickel and accelerate the dissolution.

In some embodiments of the present disclosure, in step S1, a molar ratio of nitrogen in ammonia water to ammonium sulfate is (0.1-20):1; a total molar concentration of nitrogen in ammonia water and ammonium sulfate is 8 mol/L to 15 mol/L.

In some embodiments of the present disclosure, in step S1, a pressure of the leaching is 2.5 MPa to 4.0 MPa, and a temperature of the leaching is 50° C. to 65° C. Furthermore, a time for leaching is 6 h to 8 h.

In some embodiments of the present disclosure, in step S2, the precipitant is at least one of thiosulfate, sodium sulfide, or ammonium sulfide. Copper can be removed deeply by adding a precipitant, and the reaction equation for removing copper is:

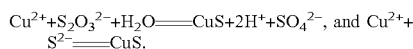

In some embodiments of the present disclosure, in step S2, an ammonia-containing gas produced by distilling ammonia is condensed to prepare ammonia water for recycling, and the precipitate generated in the process of distilling ammonia is used to recover copper.

In some embodiments of the present disclosure, a pressure of the second-stage leaching is 3.5 MPa to 6.0 MPa, and a temperature of the second-stage leaching is 60° C. to 75° C. Furthermore, a time for leaching is 3 h to 4 h.

In some embodiments of the present disclosure, a pressure of the third-stage leaching is 5.5 MPa to 7.0 MPa, and a temperature of the third-stage leaching is 70° C. to 85° C. Furthermore, a time for leaching is 3 h to 4 h.

In some embodiments of the present disclosure, in step S3, the extractant is at least one of P204, P507, DEHPA or Cyanex272.

In some embodiments of the present disclosure, in step S3, the extracted organic phase obtained by the back extraction of nickel can be re-saponified and recycled.

In some embodiments of the present disclosure, in step S3, the concentration of sulfuric acid is 3 mol/L to 5 mol/L.

A preferred embodiment of the present disclosure has at least the following beneficial effects.

1. In the present disclosure, the nickel-iron-copper alloy is oxidized and dissolved by ammonia under the conditions of high-pressure oxygen and ammonia, with the help of the corrosion aid. This method separates the nickel-iron-copper alloy based on the different properties of nickel and iron, wherein, nickel is dissolved in a form of a hexammine complex of nickel, and part of copper is dissolved in a form of a tetrammine complex of copper, while the iron cannot be dissolved and remains in the solid. The reaction equation of the leaching process is as follows:

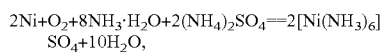

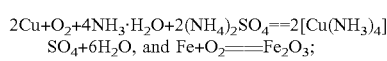

Additionally, after the filtrate is collected, a precipitant is added and the ammonia is distilled to remove copper. During this process, $[Cu(NH_3)_4]^{2+} = Cu^{2+} + 4NH_3$, distilling ammonia promotes ionization of copper ions, the ammonia water is recycled, and copper ions react with the precipitant to form a copper sulfide precipitation, thereby removing the copper in the filtrate, which facilitates the separation of nickel during subsequent extraction, and further improving the purity of nickel sulfate.

2. The present disclosure has a short process, which greatly improves the yield of nickel. The nickel sulfate is directly synthesized in one step from nickel-iron-copper alloys, thereby the purity of the nickel sulfate product obtained can reach battery-grade purity, which not only reduces the investment cost, but also the reaction process has low energy consumption and low consumption of auxiliary materials, and is suitable for industrialization production. The present disclosure can be widely used in the production process of nickel sulfate, especially in the production of battery-grade nickel sulfate from nickel-iron-copper alloys.

BRIEF DESCRIPTION OF DRAWINGS

The present disclosure will be further described in details below with reference to the accompanying drawing and examples.

FIG. 1 shows a process flow chart of Example 1 of the present disclosure.

DETAILED DESCRIPTION

Hereinafter, the concept of the present disclosure and the technical effects produced will be described clearly and completely with reference to the examples, so as to fully understand the purpose, features and effects of the present disclosure. It is apparent that the described examples are only a part of the examples of the present disclosure, and not all of the examples, and other examples obtained by those skilled in the art based on the examples of the present disclosure without creative efforts fall within the protection scope of the present disclosure.

Example 1

In this example, a battery-grade nickel sulfate was prepared by high-pressure ammonia leaching of a nickel-iron-copper alloy, referring to FIG. 1, and the specific process is as follows:

S1: 100 g of nickel-iron-copper alloy having a composition of: 33.99% of nickel, 47.35% of iron, and 18.66% of copper was crushed into powders; in a closed high-pressure oxygen environment, 10 L of ammonia water-ammonium sulfate mixture was added to the crushed nickel-iron-copper alloy, wherein, the molar ratio of nitrogen in ammonia water to ammonium sulfate was 3.3:1, and the total molar concentration of nitrogen in ammonia water and ammonium sulfate was 15 mol/L, and 15 g of ammonium sulfide as a corrosion aid was added to perform a first-stage leaching, wherein the pressure of the first-stage leaching was 2.5 MPa, the leaching temperature was 50° C., and the leaching time was 8 h;

S2: a solid-liquid separation was performed on a slurry obtained by leaching in step S1 to obtain a first filtrate and a first residue; thiosulfate was added to the first filtrate, then the first filtrate was subjected to an ammonia distilling-copper removal process; after filtration, the filtrate was subjected to an extraction process, and the produced copper sulfide precipitate was sent to a copper plant for processing;

S3: nickel was extracted with an extractant P204, left standing and then separated to obtain a nickel-containing extracted organic phase and an impurity-containing raffinate; nickel was back extracted from the nickel-containing extracted organic phase with 3 mol/L of $H_2SO_4$ solution to obtain a battery-grade nickel sulfate solution;

S4: 2 L of ammonia water-ammonium sulfate mixture (the composition thereof is the same as step S1) and 3 g of ammonium sulfide were added into the first residue, which was then subjected to a second-stage leaching under a high-pressure oxygen environment; the pressure of the second-stage leaching was 5.0 MPa, the leaching time was 3.5 h and the leaching temperature was 65° C.; after that, a second residue and a second filtrate were obtained by filtration, and the second filtrate was subjected back to the process of first-stage leaching; and S5: 1 L of ammonia water-ammonium sulfate mixture (the composition thereof is the same as step S1) and 2 g of ammonium sulfide were added into the second residue, which was then subjected to a third-stage leaching under a high-pressure oxygen environment; the pressure of the third-stage leaching was 5.5 MPa, the leaching time was 4 h and the leaching temperature was 70° C.; after that, a third residue and a third filtrate were obtained by filtration, and the third filtrate was subjected back to the process of first-stage leaching or second-stage leaching, and the third residue was washed to obtain an iron dreg.

The 32.76 g (calculated in nickel) of nickel sulfate was obtained, from which it can be seen that the leaching rate of nickel was 96.38%.

Example 2

In this example, a battery-grade nickel sulfate was prepared by high-pressure ammonia leaching of a nickel-iron-copper alloy, and the specific process is as follows:

S1: 100 g of nickel-iron-copper alloy having a composition of: 42.36% of nickel, 46.19% of iron, and 11.45% of copper was crushed into powders; in a closed high-pressure oxygen environment, 7 L of ammonia water-ammonium sulfate mixture was added to the crushed nickel-iron-copper alloy, wherein, the molar ratio of nitrogen in ammonia water to ammonium sulfate was 3.6:1, and the total molar concentration of nitrogen in ammonia water and ammonium sulfate was 10 mol/L, and 17 g of ammonium thiosulfate as a corrosion aid was added to perform a first-stage leaching, wherein the pressure of the first-stage leaching was 4.0 MPa, the leaching temperature was 65° C., and the leaching time was 6 h;

S2: a solid-liquid separation was performed on a slurry obtained by leaching in step S1 to obtain a first filtrate and a first residue; thiosulfate was added to the first filtrate, then the first filtrate was subjected to an ammonia distilling-copper removal process; after filtration, the filtrate was subjected to an extraction process, and the produced copper sulfide precipitate was sent to a copper plant for processing;

S3: nickel was extracted with an extractant P204, left standing and then separated to obtain a nickel-containing extracted organic phase and an impurity-containing raffinate; nickel was back extracted from the nickel-containing extracted organic phase with 4 mol/L of $H_2SO_4$ solution to obtain a battery-grade nickel sulfate solution;

S4: an ammonia water-ammonium sulfate mixture and 7 g of ammonium thiosulfate were added into the first residue, which was then subjected to a second-stage leaching under a high-pressure oxygen environment; the pressure of the second-stage leaching was 3.5 MPa, the leaching time was 4 h and the leaching temperature was 60° C.; after that, a second residue and a second filtrate were obtained by filtration, and the second filtrate was subjected back to the process of first-stage leaching; and S5: an ammonia water-ammonium sulfate mixture and 3 g of ammonium thiosulfate were added into the second residue, which was then subjected to a third-stage leaching under a high-pressure oxygen environment; the pressure of the third-stage leaching was 7.0 MPa, the leaching time was 3 h and the leaching temperature was 85° C.; after that, a third residue and a third filtrate were obtained by filtration, and the third filtrate was subjected back to the process of first-stage leaching or second-stage leaching, and the third residue was washed to obtain an iron dreg.

The 41.10 g (calculated in nickel) of nickel sulfate was obtained, from which it can be seen that the leaching rate of nickel was 97.02%.

Example 3

In this example, a battery-grade nickel sulfate was prepared by high-pressure ammonia leaching of a nickel-iron-copper alloy, and the specific process is as follows:

S1: 100 g of nickel-iron-copper alloy having a composition of: 10.58% of nickel, 45.74% of iron, and 43.68% of copper was crushed into powders; in a closed high-pressure oxygen environment, 5 L of ammonia water-ammonium sulfate mixture was added to the crushed nickel-iron-copper alloy, wherein, the molar ratio of nitrogen in ammonia water to ammonium sulfate was 2.4:1, and the total molar concentration of nitrogen in ammonia water and ammonium sulfate was 8 mol/L, and 5 g of persulfate as a corrosion aid was added to perform a first-stage leaching, wherein the pressure of the first-stage leaching was 3.0 MPa, the leaching temperature was 55° C., and the leaching time was 7 h;

S2: a solid-liquid separation was performed on a slurry obtained by leaching in step S1 to obtain a first filtrate and a first residue; 46.8 g of ammonium sulfide was added to the first filtrate, then the first filtrate was subjected to an ammonia distilling-copper removal process; after filtration, the filtrate was subjected to an extraction process, and the produced copper sulfide precipitate was sent to a copper plant for processing;

S3: nickel was extracted with an extractant P204, left standing and then separated to obtain a nickel-containing extracted organic phase and an impurity-containing raffinate; nickel was back extracted from the nickel-containing extracted organic phase with 5 mol/L of $H_2SO_4$ solution to obtain a battery-grade nickel sulfate solution;

S4: an ammonia water-ammonium sulfate mixture and 8 g of persulfate were added into the first residue, which was then subjected to a second-stage leaching under a high-pressure oxygen environment; the pressure of the second-stage leaching was 6.0 MPa, the leaching time was 3 h and the leaching temperature was 75° C.; after that, a second residue and a second filtrate were obtained by filtration, and the second filtrate was subjected back to the process of first-stage leaching; and S5: an ammonia water-ammonium sulfate mixture and 10 g of persulfate were added into the second residue, which was then subjected to a third-stage leaching under a high-pressure oxygen environment; the pressure of the third-stage leaching was 6.0 MPa, the leaching time was 3.5 h and the leaching temperature was 80° C.; after that, a third residue and a third filtrate were obtained by filtration, and the third filtrate was subjected back to the process of first-stage leaching or second-stage leaching, and the third residue was washed to obtain an iron dreg.

The 10.15 g (calculated in nickel) of nickel sulfate was obtained, from which it can be seen that the leaching rate of nickel was 95.98%.

The embodiments of the present disclosure are described in detail above with reference to the accompanying drawings, but the present disclosure is not limited to the above-mentioned embodiments, and various changes can be made without departing from the concept of the present disclosure within the scope of knowledge possessed by those of ordinary skill in the art. In addition, embodiments and features in the embodiments in the present disclosure can be combined with each other under the premise of no conflict.

What is claimed is:

1. A method for preparing nickel sulfate from a nickel-iron-copper alloy, comprising the following steps:

S1: mixing a crushed nickel-iron-copper alloy, ammonia water, ammonium sulfate and a corrosion aid in a high-pressure oxygen environment and performing leaching; the corrosion aid is at least one of ammonium sulfide, persulfate, or ammonium thiosulfate; a pressure of the leaching is 2.5 MPa to 4.0 MPa, and a temperature of the leaching is 50° C. to 65° C.;

S2: performing a solid-liquid separation on a slurry obtained by the leaching in step S1 to obtain a first filtrate and a first residue, adding a precipitant to the first filtrate, then distilling ammonia, and then performing filtration to obtain a nickel-containing leaching solution, wherein the precipitant is at least one of thiosulfate, sodium sulfide, or ammonium sulfide, and wherein each of the first filtrate and the first residue comprises copper; and S3: adding an extractant into the nickel-containing leaching solution to extract nickel, allowing the system to stand and then separating to obtain a nickel-containing extracted organic phase, and then adding sulfuric acid into the nickel-containing extracted organic phase to perform a back extraction of nickel to obtain a nickel sulfate solution.

2. The method according to claim 1, wherein, in step S2, the method further comprises mixing the first residue with ammonia water, ammonium sulfate and a corrosion aid and performing second-stage leaching, then performing a solid-liquid separation to obtain a second residue and a second filtrate, and subjecting the second filtrate back to the leaching in step S1.

3. The method according to claim 2, wherein, in step S2, the method further comprises mixing the second residue with ammonia water, ammonium sulfate and a corrosion aid and performing third-stage leaching, then performing a solid-liquid separation to obtain a third residue and a third filtrate, subjecting the third filtrate back to the leaching in step S1 or the second-stage leaching, and washing the third residue to obtain an iron dreg.

4. The method according to claim 1, wherein, in step S1, a molar ratio of nitrogen in ammonia water to ammonium sulfate is (0.1-20):1; and a total molar concentration of nitrogen in ammonia water and ammonium sulfate is 8 mol/L to 15 mol/L.

5. The method according to claim 2, wherein, a pressure of the second-stage leaching is 3.5 MPa to 6.0 MPa, and a temperature of the second-stage leaching is 60° C. to 75° C.

6. The method according to claim 3, wherein, a pressure of the third-stage leaching is 5.5 MPa to 7.0 MPa, and a temperature of the third-stage leaching is 70° C. to 85° C.

7. The method according to claim 1, wherein, in step S3, the extractant is at least one of P204, P507, DEHPA or Cyanex272.

* * * * *